(12) United States Patent
Saha et al.

(10) Patent No.: US 12,248,201 B2
(45) Date of Patent: Mar. 11, 2025

(54) FILMS HAVING GRIN ELEMENTS FOR APPLICATION TO SPECTACLES OR OTHER OPHTHALMIC LENSES

(71) Applicant: CooperVision International Limited, Fareham (GB)

(72) Inventors: Sourav Saha, Pleasanton, CA (US); Paul Chamberlain, Livermore, CA (US); Arthur Bradley, Bloomington, IN (US); Baskar Arumugam, Dublin, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 441 days.

(21) Appl. No.: 17/870,870

(22) Filed: Jul. 22, 2022

(65) Prior Publication Data
US 2023/0031798 A1    Feb. 2, 2023

Related U.S. Application Data

(60) Provisional application No. 63/227,373, filed on Jul. 30, 2021.

(51) Int. Cl.
G02C 7/06    (2006.01)
(52) U.S. Cl.
CPC .................................. G02C 7/063 (2013.01)
(58) Field of Classification Search
CPC ........ B29D 11/00317; B29D 11/00355; B29D 11/0073; B29D 11/00788; B29D 11/00865; G02B 1/10; G02B 3/0087; G02C 7/086; G02C 7/021; G02C 7/063; G02C 7/044; G02C 7/04; G02C 7/022; G02C 9/00; G02C 2202/12; G02C 2202/16; G02C 2202/24
USPC .................................................... 351/159.41
See application file for complete search history.

(56) References Cited

U.S. PATENT DOCUMENTS

| 9,810,892 B2 | 11/2017 | Prakash et al. | |
|---|---|---|---|
| 10,175,505 B2 * | 1/2019 | Muschielok | G02C 7/061 |
| 2005/0018131 A1 * | 1/2005 | Ishak | G02C 7/108 |
| | | | 351/159.62 |

(Continued)

FOREIGN PATENT DOCUMENTS

| CN | 213601010 U | 7/2021 |
|---|---|---|
| EP | 2067613 A1 | 6/2009 |

(Continued)

OTHER PUBLICATIONS

International Search Report and Written Opinion issued in corresponding International Patent Application No. PCT/GB2022/051975 dated Oct. 31, 2022 (14 pages).

(Continued)

*Primary Examiner* — William R Alexander
(74) *Attorney, Agent, or Firm* — Kilyk & Bowersox, P.L.L.C.

(57) ABSTRACT

A film for applying to an ophthalmic lens is described. The film, or the combination of the film and the ophthalmic lens are designed to prevent or slow the development or progression of myopia. The film has a base refractive index and includes at least one gradient index optical element. Ophthalmic lenses, such as spectacle lenses and contact lenses, that include the films are also described.

19 Claims, 10 Drawing Sheets

(56) References Cited

U.S. PATENT DOCUMENTS

| | | | |
|---|---|---|---|
| 2006/0092374 A1* | 5/2006 | Ishak | G02C 7/12 351/159.62 |
| 2007/0132948 A1 | 6/2007 | Evans et al. | |
| 2008/0123048 A1* | 5/2008 | Volk | G02C 7/061 351/159.42 |
| 2008/0123049 A1* | 5/2008 | Volk | B29D 11/00028 351/159.41 |
| 2010/0238400 A1* | 9/2010 | Volk | G02C 7/061 156/60 |
| 2011/0051079 A1 | 3/2011 | Martinez et al. | |
| 2012/0310340 A1 | 12/2012 | Knox et al. | |
| 2014/0055736 A1* | 2/2014 | Ishak | G02C 7/104 351/44 |
| 2016/0377884 A1 | 12/2016 | Lau et al. | |
| 2016/0377886 A1 | 12/2016 | Quiroga et al. | |
| 2017/0108711 A1* | 4/2017 | Muschielok | G02C 7/061 |
| 2017/0131567 A1 | 5/2017 | To et al. | |
| 2017/0269379 A1 | 9/2017 | Arieli et al. | |
| 2019/0235275 A1 | 8/2019 | Gloge | |
| 2019/0324289 A1* | 10/2019 | Glöge | G02B 1/041 |
| 2020/0018874 A1 | 1/2020 | Chisum et al. | |
| 2020/0073147 A1 | 3/2020 | Bakaraju et al. | |
| 2022/0252904 A1 | 8/2022 | Hones, Jr. et al. | |
| 2022/0326547 A1 | 10/2022 | Bakaraju | |

FOREIGN PATENT DOCUMENTS

| | | |
|---|---|---|
| EP | 3816677 A1 | 5/2021 |
| EP | 4101626 A1 | 12/2022 |
| JP | 2007519959 A | 7/2007 |
| JP | 2014527839 A | 10/2014 |
| JP | 2017010031 A | 1/2017 |
| TW | 202101070 A | 1/2021 |
| TW | 202122876 A | 6/2021 |
| WO | 2018076057 A1 | 5/2018 |
| WO | 2020180817 A1 | 9/2020 |

OTHER PUBLICATIONS

International Preliminary Report on Patentability issued in corresponding International Patent Application No. PCT/GB2022/051975 dated Nov. 9, 2023 (15 pages).

Office Action issued in corresponding United Kingdom Patent Application GB2210982.1 dated Jan. 24, 2023 (8 pages).

Office Action issued in corresponding Taiwan Patent Application 111128503 issued Jul. 7, 2023 (with English translation) (9 pages).

PCT Demand filed May 22, 2023 in corresponding International Patent Application No. PCT/GB2022/051975 (15 pages).

Second Written Opinion issued in corresponding International Patent Application No. PCT/GB2022/051975 dated Jun. 9, 2023 (5 pages).

Response to Second Written Opinion filed Aug. 1, 2023 in corresponding International Patent Application No. PCT/GB2022/051975 (11 pages).

Examination Report issued in corresponding United Kingdom Patent Application No. GB2210982.1 dated Aug. 7, 2024 (4 pages).

Koike et al., "New interfacial-gel copolymerization technique for steric GRIN polymer optical waveguides and lens arrays," Applied Optics, Feb. 1, 1988, vol. 27, No. 3, pp. 486-491.

Paschotta, "RP-Photonics—Microlenses", https://web.archive.org/web/20200916094215/https://www.rpphotonics.com/microlenses.html, Sep. 16, 2020 (6 pages).

Philip, "What's New in Spectacle Lenses for Myopia Management?," https://web.archive.org/web/20210617060650/ https://bhvi.org/news/whats-new-in-spectaclelenses-for-myopia-management/, Mar. 30, 2021 (10 pages).

Ye et al., "GRIN lens and GRIN lens array fabrication with diffusion-driven photopolymer," OSA/CLEO/IQEC, 2009 IEEE, pp. 1-2.

Examination Report issued in corresponding Australia Patent Application No. 2022317315 dated Aug. 23, 2024 (3 pages).

Office Action issued in corresponding Japanese Patent Application No. 2024-504525 dated Oct. 31, 2024 (9 pages).

* cited by examiner

FILMS HAVING GRIN ELEMENTS FOR APPLICATION TO SPECTACLES OR OTHER OPHTHALMIC LENSES

This application claims the benefit under 35 U.S.C. § 119(e) of prior U.S. Provisional Patent Application No. 63/227,373, filed Jul. 30, 2021, which is incorporated in its entirety by reference herein.

The present disclosure concerns films including at least one gradient index optical element for applying to ophthalmic lenses, and ophthalmic lenses with such films.

BACKGROUND

Many people, including children and adults require ophthalmic lenses to correct for myopia (short-sightedness), and many adults require ophthalmic lenses to correct for presbyopia (an age-related inability to accommodate and hence inability to focus on near objects). Ophthalmic lenses may also be required to correct for hyperopia (far-sightedness), astigmatism, or keratoconus (a condition whereby the cornea gradually bulges to form a cone shape).

Myopic eyes focus incoming light from distant objects to a location in front of the retina. Consequently, the light converges towards a plane in front of the retina and diverges towards, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach is to provide lenses having both regions that provide full correction of distance vision and regions that under-correct, or deliberately induce, myopic defocus. Lenses may also be provided that increase scattering of light in certain regions, compared to light passing through the fully correcting region of the lens. It has been suggested that these approaches can prevent or slow down the development or progression of myopia in children or young people, whilst providing good distance vision.

In the case of lenses having a region that provide defocus, the regions that provide full-correction of distance vision are usually referred to as base power regions and the regions that provide under-correction or deliberately induce myopic defocus are usually referred to as add power regions or myopic defocus regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e. closer to the lens), whilst the distance power region(s) are designed to focus light and form an image at the retina (i.e. further away from the lens).

In the case of lenses that increase scattering of light in a certain region, features that increase scattering may be introduced into a lens surface or may be introduced into the material that is used to form the lens. For example, scattering elements may be burned into the lens, or embedded in the lens. Scattering elements may be laser ablated optical elements embedded in the lens material.

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e. the eye's natural ability to change focal length) to bring nearby objects into focus, in theory, wearers can make use of the additional focus in front of the retina that results from the annular add power region to focus near objects; in other words, wearers can inadvertently use the lenses in the same manner as presbyopia correction lenses are used, which is undesirable for young subjects.

Further lenses have been developed which can be used in the treatment of myopia, and which are designed to eliminate the halo that is observed around focused distance images in the MISIGHT (CooperVision, Inc.) lenses and other similar lenses described above. In these lenses, the annular region is configured such that no single, on-axis image is formed in front of the retina, thereby preventing such an image from being used to avoid the need for the eye to accommodate near targets. Rather, distant point light sources are imaged by the annular region to a ring-shaped focal line at a near add power focal surface, leading to a small spot size of light, without a surrounding 'halo' effect, on the retina at a distance focal surface.

It has been recognised that ophthalmic lenses for use in preventing or slowing the progression of myopia are typically specifically designed for such a purpose. These lenses may be expensive and complex in design, and as a lens wearer's requirements change over time, may need to purchase different lenses providing different levels of correction.

The present invention seeks to provide a simple and cost-effective alternative to known lenses for use in preventing or slowing of the worsening of myopia. Such lenses may also be beneficial in correcting or improving vision associated with presbyopia, hyperopia, astigmatism, keratoconus or other refractive anomalies.

SUMMARY

According to a first aspect, the present disclosure provides a film for applying to an ophthalmic lens. The film has a base refractive index and includes at least one gradient index optical element.

According to a second aspect, the present disclosure provides an ophthalmic lens comprising a film. The film has a base refractive index, and includes at least one gradient index optical element.

According to a third aspect, the present disclosure provides spectacles comprising an ophthalmic lens. The ophthalmic lens comprises a film, wherein the film has a base refractive index, and includes at least one gradient index optical element.

It will of course be appreciated that features described in relation to one aspect of the present disclosure may be incorporated into other aspects of the present disclosure.

DETAILED DESCRIPTION

Figure 1:
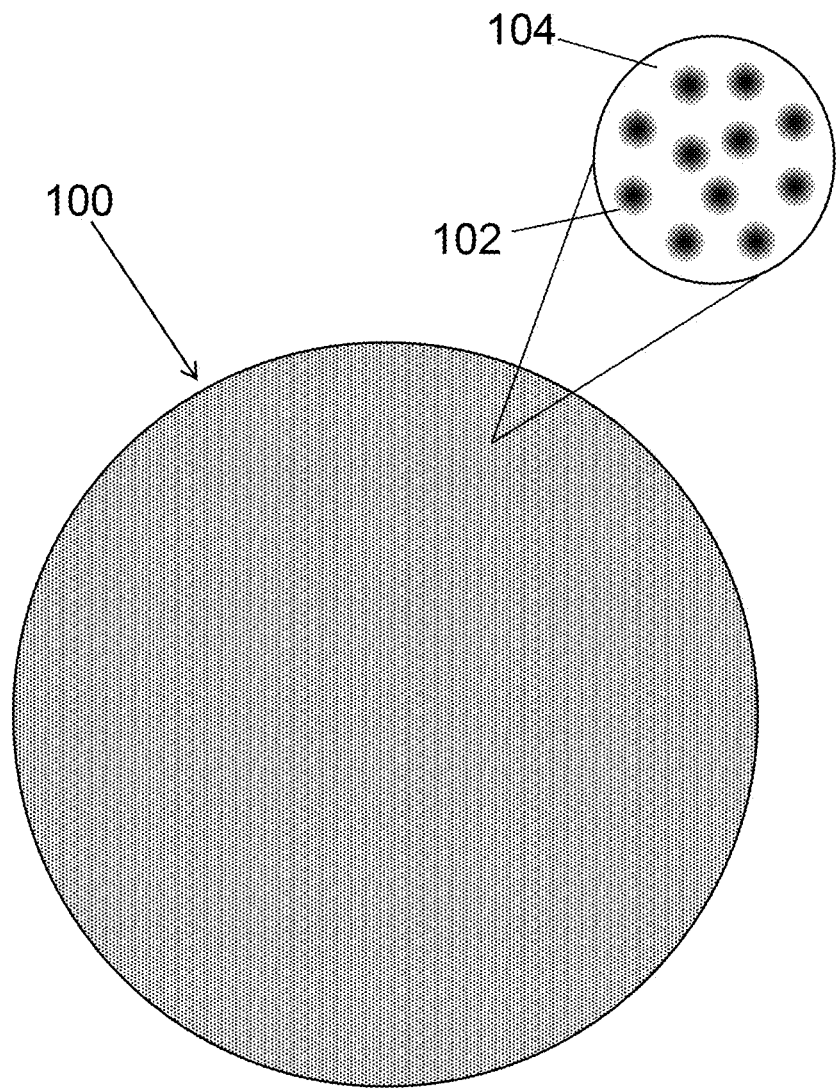
FIG. 1 is a schematic top view of a film including a plurality of GRIN elements, according to an embodiment of the present disclosure.

According to a first aspect, the present disclosure provides film for applying to an ophthalmic lens. The film has a base refractive index and includes at least one gradient index optical element. The film may be a cross-linked polymeric thin film including at least one gradient index optical element. The film may have been formed from a matrix of un-cross-linked polymers. The film may be a Bayfol® HX film.

The film may be for applying to an ophthalmic lens to prevent or slow the development or progression of myopia. The film may be for applying to an ophthalmic lens, for correcting presbyopia, hyperopia, astigmatism, keratoconus or another refractive anomaly.

The base refractive index of the film may be constant. The base refractive index of the film may be between 1.3 and 1.8, preferably about 1.5. Each of the at least one GRIN optical elements may have an average refractive power that is greater than the base refractive power. Alternatively, each of the at least one GRIN optical elements may have an average refractive power that is less than the base refractive power.

In the context of the present disclosure, each of the at least one gradient index (GRIN) optical elements is an element that has a varying refractive index. The variation in refractive index may be a transverse variation in refractive index across the element, i.e. in a direction that runs along a surface of the film. The variation in refractive index may be a radial variation in refractive index, i.e. the refractive index may vary extending radially outwardly from a point. The variation in refractive index may be an axial variation in refractive index, i.e., in a direction that runs normal to a surface of the film. Each of the at least one GRIN optical elements may have a transverse variation in refractive index and an axial variation in refractive index. The variation in refractive index of each of the at least one GRIN optical elements may be a linearly varying gradient in refractive index, or a gradient that has a varying profile defined by a quadratic function.

The GRIN elements may be lenses. Advantageously, the GRIN elements may provide defocusing. It is believed that defocusing may help to prevent or slow of the worsening of myopia. It is believed that defocusing may help to correct or improve vision associated with presbyopia, hyperopia, astigmatism, keratoconus or other refractive anomalies.

Each of the at least one GRIN optical elements may give rise to additional scattering of light that falls incident on the GRIN optical element, compared to light falling incident on the remainder of the film. Alternatively, each of the at least one GRIN optical elements may give rise to reduced scattering of light that falls incident on the GRIN optical element, compared to light falling incident on the remainder of the film. Each of the at least one GRIN optical elements may have a minimum change in refractive index, compared to the base refractive index, of at least 0.001, preferably at least 0.005. Each of the at least one GRIN optical elements may have a minimum refractive index that is 0.001 greater than the base refractive index. Each of the at least one GRIN optical elements may have a minimum refractive index that is 0.005 greater than the base refractive index. Each of the at least one GRIN optical elements may have a maximum refractive index that is 0.005 less than the base refractive index. Each of the at least one GRIN optical elements may have a maximum refractive index that is 0.001 less than the base refractive index. Each of the at least one GRIN optical elements may have a maximum change in refractive index, compared to the base refractive index of less than 0.1, preferably less than 0.025. Each of the at least one GRIN optical elements may have a maximum refractive index that is 0.1 greater than the base refractive index. Each of the at least one GRIN optical elements may have a maximum refractive index that is 0.025 greater than the base refractive index. Each of the at least one GRIN optical elements may have a minimum refractive index that is 0.1 less than the base refractive index. Each of the at least one GRIN optical elements may have a minimum refractive index that is 0.025 less than the base refractive index. Each of the at least one GRIN optical elements may have a minimum refractive power that is between −25 D and 25 D, preferably between −0.25 D and 25 D.

Each of the at least one GRIN optical elements may extend through the thickness of the film. Each of the at least one GRIN optical elements may extend partway through the thickness of the film. Each of the at least one GRIN optical elements may be embedded within the film. Each of the at least one GRIN elements may be approximately cuboidal or spherical in shape.

The film may have been cut, formed or shaped to have an area that is suitable for applying to a spectacle lens, or a contact lens. The film may be configured or sized and shaped for a spectacle lens, and may have an area between 300 mm$^2$ and 5000 mm$^2$, preferably between 1000 mm$^2$ and 3000 mm$^2$. A film for applying to spectacle lenses may be circular, oval, elliptical, square or rectangular in shape. The film may be configured or sized and shaped for applying to a contact lens, and may have an area between 60 mm$^2$ and 750 mm$^2$. A film for applying to contact lenses may be circular, oval, elliptical, square or rectangular in shape. A film for applying to contact lenses may have a diameter of between 6 mm and 20 mm, preferably between 9 mm and 16 mm.

The film may have a uniform thickness. For a contact lens, the film may have a thickness of between 1 μm and 100 μm, preferably between 10 μm and 20 μm, and more preferably between 14 μm and 18 μm. For a spectacle lens, the film may have a thickness of between 1 μm and 1000 μm, preferably between 10 μm and 20 μm, and more preferably between 14 μm and 18 μm.

The film may comprise a plurality of gradient index elements that are distributed across an area of the film. The plurality of GRIN optical elements may be distributed across the whole area of the film. The plurality of GRIN optical elements may be distributed across a portion of the film. The plurality of GRIN optical elements may be randomly distributed across all or a portion of the film. The GRIN optical elements may be arranged in a regular pattern across all or a portion of the film. If such a film is applied to a spectacle lens, this may advantageously enable defocus (caused by the GRIN elements) to be maintained as the lens wearers eye moves relative to the lens. A plurality of GRIN elements distributed across a spectacle lens may enable a consistent myopic defocus to be maintained.

Each gradient index optical element may have a diameter or width of between about 10 μm and 10 mm. Each of the at least one gradient index optical elements may have a volume of between 100 μm$^3$ and 3 mm$^3$. The plurality of gradient optical elements occupy between 5% and 80% of the volume of the layer. The plurality of gradient index optical elements may span between 20% and 80% of a surface area of the film. The film may include between 2 and 5000 gradient index optical elements. The gradient index optical elements may occupy between about 20% and 80% of a surface area of the film.

Each of the plurality of GRIN elements may have the same variation in refractive index. Each of the plurality of GRIN elements may have a different variation in refractive index. Some of the GRIN elements may have the same variation in refractive index, and other elements may have a different variation in refractive index. A plurality of GRIN optical elements may be distributed such that GRIN optical elements having the same or a similar variation in refractive index may be grouped in clusters or in an ordered arrangement. The film may be dividable into a plurality of distinct portions, with each portion comprising GRIN optical elements having a different variation in refractive index.

The GRIN optical elements may be positioned at regular intervals across the whole film or a portion of the film. The gradient index optical elements may be arranged on lattice points of a triangular lattice. The GRIN optical elements may be arranged on lattice points of a square or rectangular lattice. The GRIN optical elements may be arranged to form an annular pattern. The annular pattern may comprise a single annulus or a plurality of concentric annuli.

Each of the at least one gradient index optical elements may be a photocured optical element. Each gradient index optical element may have been formed using photocuring. Each gradient index optical element may have been formed using photocuring with a digital light projection system, a direct laser writing system, or a collimated LED or laser light source. A high resolution 3D photocurable system, such as a two photon confocal microscope based laser illumination system may be used to photocure each GRIN element.

Each of the at least one gradient index optical elements may have a varying refractive index profile defined by a quadratic function. Each of the at least one GRIN optical elements may have varying refractive index profile defined by a higher order polynomial function. Each of the at least one GRIN optical elements may have varying refractive index profile defined by a Gaussian function.

The film may comprise a central region and an annular region surrounding the central region. The annular region may include the at least one gradient index optical element. The central region may have the base refractive index. Each of the at least one GRIN optical element may be a GRIN optical element as described above.

As used herein, the term annular region refers to a region that may extend around the entire outer edge of the central region, or may extend partially around the outer edge of the central region. The annular region may be circular, oval or elliptical in shape. The annular region may include a plurality of GRIN optical elements. The plurality of GRIN optical elements may be distributed around the entire annular region, or may be distributed across a portion of the annular region. The plurality of gradient index optical elements may be arranged periodically around the annular region. The film may include a plurality of concentric annular regions, and each of the concentric annular regions may include at least one GRIN optical element. Each concentric annular region may include a plurality of GRIN elements. A plurality of GRIN optical elements may cover a portion of each annular region. Using the angle θ to define the position around the annular region, wherein θ varies between 0° and 360° a plurality of GRIN optical elements may cover the same range of θ angles for each annular region (i.e. the GRIN elements may be in phase for each annular region, with maxima and minima at the same θ values for each annular region), or may occupy different ranges of θ angles (i.e. the GRIN elements may be out of phase for each annular region, with maxima and minima at different θ values for each element). At least one GRIN element in a first annular region may therefore be out of phase with at least one GRIN element in an adjacent second annular region. At least one GRIN element in a first annular region may be in phase with at least one GRIN element in an adjacent second annular region.

If the film includes a plurality of concentric annular regions, the variation in refractive index around each of the annular regions may be in phase, or out of phase.

The film may include a plurality of concentric annular regions that are radially separated by a region of the layer having the base refractive index. Alternatively, the film may include a plurality of concentric annular regions that are adjacent to each other, such that there is not a region having the base refractive index between the annular concentric gradient index optical elements.

The film may include a plurality of concentric annular regions that are radially separated by a region of the film having the base refractive index. Alternatively, the film may include a plurality of concentric annular regions that are adjacent to each other, such that there is not a region having the base refractive index between the annular concentric GRIN optical elements.

The film may have a thickness of between 1 μm and 70 μm.

The film may be readily removable from an ophthalmic lens. The film may be re-usable, such that the film can be easily removed and reapplied to the same lens or to a different lens.

The film may have an adhesive surface for adhering to the surface of an ophthalmic lens. Prior to application to an ophthalmic lens, the adhesive surface of the film may be covered by a protective film. The protective film may comprise a polymer such as polyethylene terephthalate (PET), polyethylene (PE) or cellulose triacetate (TAC). The protective film may be transparent. The protective film may be a flexible film. The adhesive surface may be a layer of adhesive, such as an epoxy-based adhesive.

The film may be provided on a substrate. The substrate may contact a first surface of the film, and a second, opposite surface of the film may be the adhesive surface. Therefore, if the film is adhered to an ophthalmic lens using the adhesive surface, the substrate may become the anterior/forward facing/exterior surface of the lens film when the film is applied to the lens. The substrate may be configured to provide a protective layer when the film is applied to a surface of an ophthalmic lens. The substrate may comprise polycarbonate (PC). The substrate may comprise polyethylene terephthalate (PET) or cellulose triacetate (TAC). The substrate may comprise a substance that has negligible birefringence. The substrate may be impermeable to water. The substrate may be scratch resistant. The substrate may have the base refractive index. The substrate may offer a degree of UV protection.

As used herein, an ophthalmic lens may be a spectacle lens or a contact lens. A contact lens may be a rigid contact lens or a soft contact lens such as a hydrogel contact lens or a silicone hydrogel contact lens.

According to a second aspect, the present disclosure provides an ophthalmic lens. The lens comprises a film, wherein the film has a base refractive index and includes at least one gradient index optical element. The film may include any of the features described above. The lens may be a spectacle lens. The lens may be a contact lens.

According to a third aspect, the present disclosure provides spectacles. The spectacles comprise an ophthalmic lens. The lens comprises a film, wherein the film has a base refractive index and includes at least one gradient index optical element. The film may include any of the features described above.

FIG. 1 shows a schematic top view of a film 100 including a plurality of gradient index (GRIN) optical elements 102, for applying to an ophthalmic lens according to an embodiment of the present disclosure. The GRIN optical elements 102 each have a gradient of refractive index that varies continuously and transversely across the element 102 in a direction parallel to the anterior surface of the film 100. The base refractive index of the film 100 is constant and the film 100 has a uniform thickness. The film 100 has a circular planform shape suitable for applying to the surface of a contact lens. The GRIN optical elements 102 are distributed at regular intervals across a surface of the film 100. Each of the GRIN optical elements 102 is a photocured optical element. When light falls incident on the GRIN optical elements 102 it is scattered more in comparison to light falling incident on the area of the film that does not contain optical elements 104. The GRIN elements 102 span about 80% of one of the surfaces of the film 100.

Figure 2:
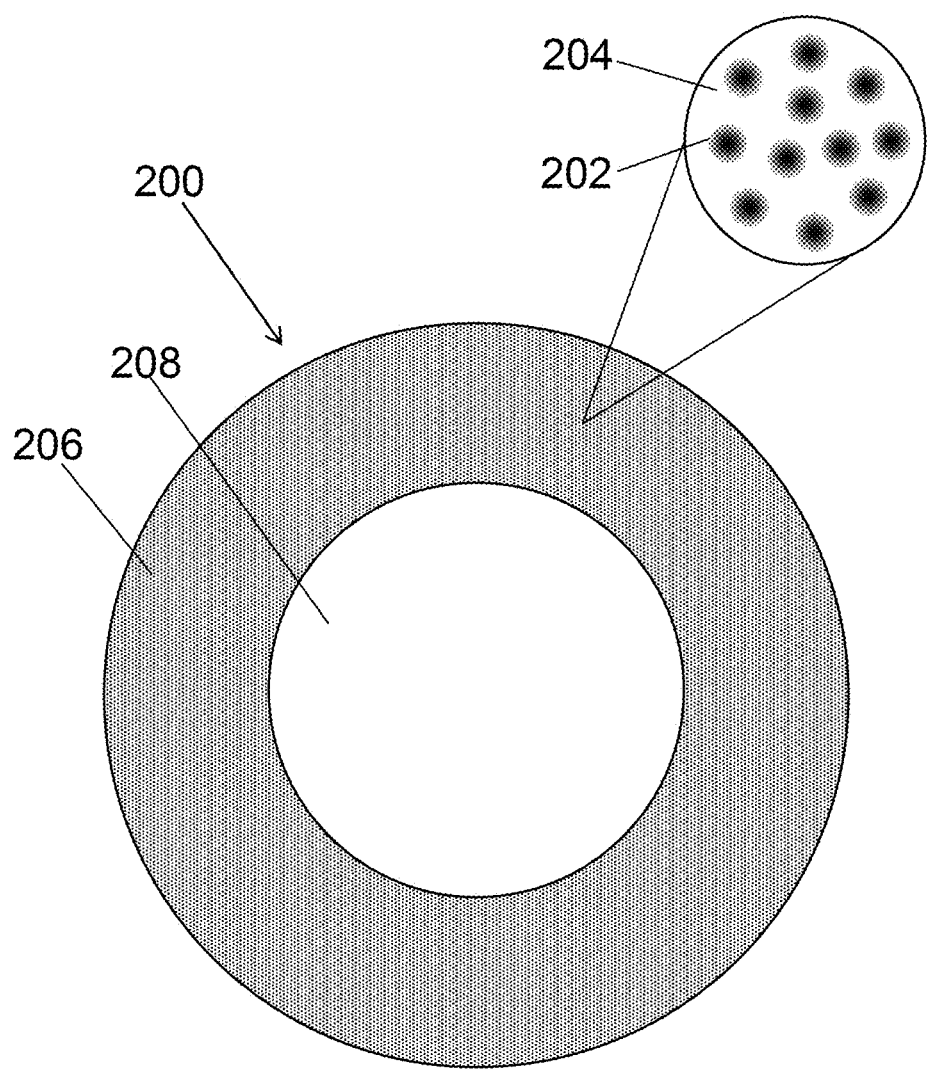
FIG. 2 is a schematic top view of a film having an annular region surrounding a central region, wherein the annular region includes a plurality of GRIN elements, according to an embodiment of the present disclosure.

FIG. 2 shows a schematic top view of film 200 for applying to an ophthalmic lens, the film having an annular region 206 surrounding a central region 208, wherein the annular region includes a plurality of GRIN optical elements 202, according to an embodiment of the present disclosure. The GRIN optical elements 202 each have a gradient of refractive index that varies continuously and transversely across the element 202 in a direction parallel to the anterior surface of the film 200, and each element has the same variation in refractive index. The base refractive index of the film 204 is constant and the film has a uniform thickness. The film 200 has a circular planform shape and is therefore suitable for applying to the surface of a contact lens. The GRIN optical elements 202 are distributed at regular intervals within the annular region 206 of film. The central region 208 of the film does not contain any GRIN optical elements. Each of the GRIN optical elements 202 is a photocured optical element. When light falls incident on the GRIN optical elements 202 it is scattered more in comparison to light falling incident on the area of the film that does not contain optical elements 208.

Figure 3A:
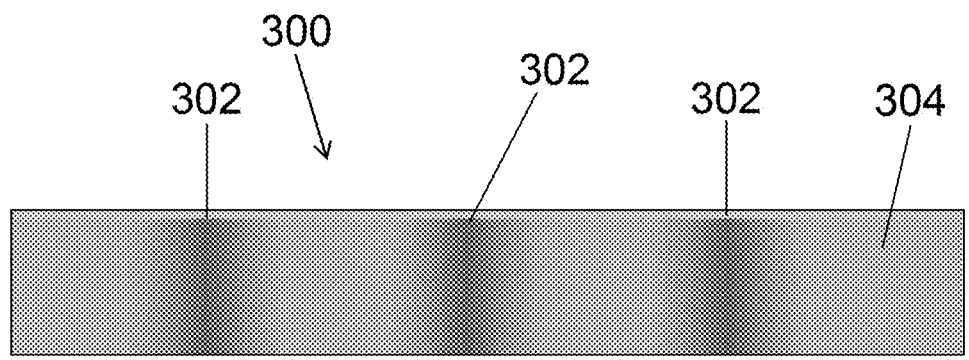
FIG. 3A shows a cross-section through a film including a plurality of GRIN elements, according to an embodiment of the present disclosure.

FIG. 3A shows a cross-section through a film 300 including a plurality of GRIN optical elements 302, according to an embodiment of the present disclosure. The GRIN optical elements 302 are photocured optical elements, which are distributed at regular intervals across the surface of the film 300. The base refractive index of the film 304 is constant and the film has a uniform thickness.

Figure 3B:
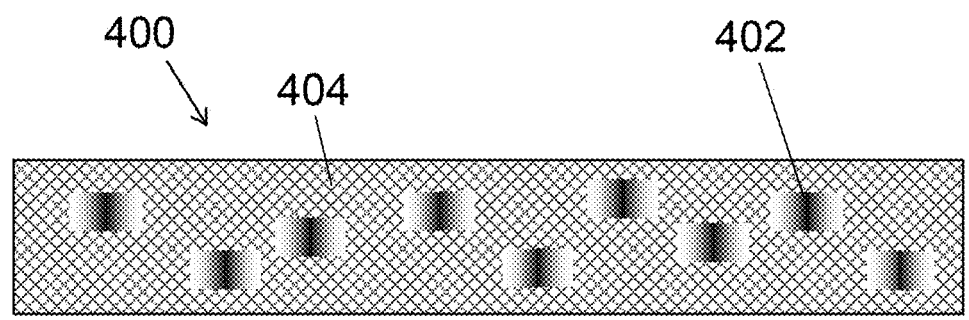
FIG. 3B shows a cross-section through a film including a plurality of cuboidal GRIN scattering elements, according to an embodiment of the present disclosure.

FIG. 3B shows a cross-section through a film 400 including a plurality of cuboidal GRIN optical elements 402, according to an embodiment of the present disclosure. The GRIN optical elements 402 are photocured optical elements, which are dispersed within the thickness of the film 400. The GRIN optical elements 402 each have a gradient of refractive index that varies radially outwards from the centre of the element 402 in a direction parallel to a surface of the layer 404. Each element 402 has the same variation in refractive index. The base refractive index of the film 400 is constant and the film 400 has a uniform thickness.

Figure 3C:
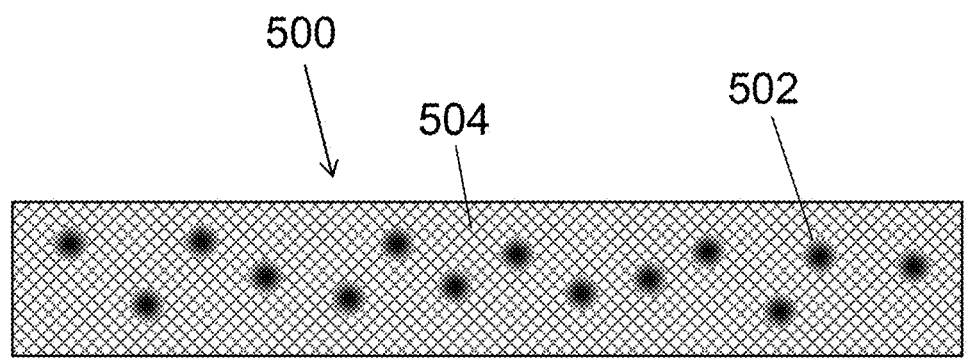
FIG. 3C shows a cross-section through a film including a plurality of spherical GRIN scattering elements, each element having a refractive index that varies radially outwards from the centre of each element, according to an embodiment of the present disclosure.

FIG. 3C shows a cross-section through a film 500 including a plurality of spherical GRIN optical elements 502, according to an embodiment of the present disclosure. The GRIN optical elements 502 are photocured optical elements, which are dispersed within the thickness of the film 500. The GRIN optical elements 502 each have a refractive index that varies radially outwards from the centre of the element 502 to the layer 504 and each element 502 has the same variation in refractive index. The base refractive index of the film 500 is constant and the film 500 has a uniform thickness.

Figure 4:
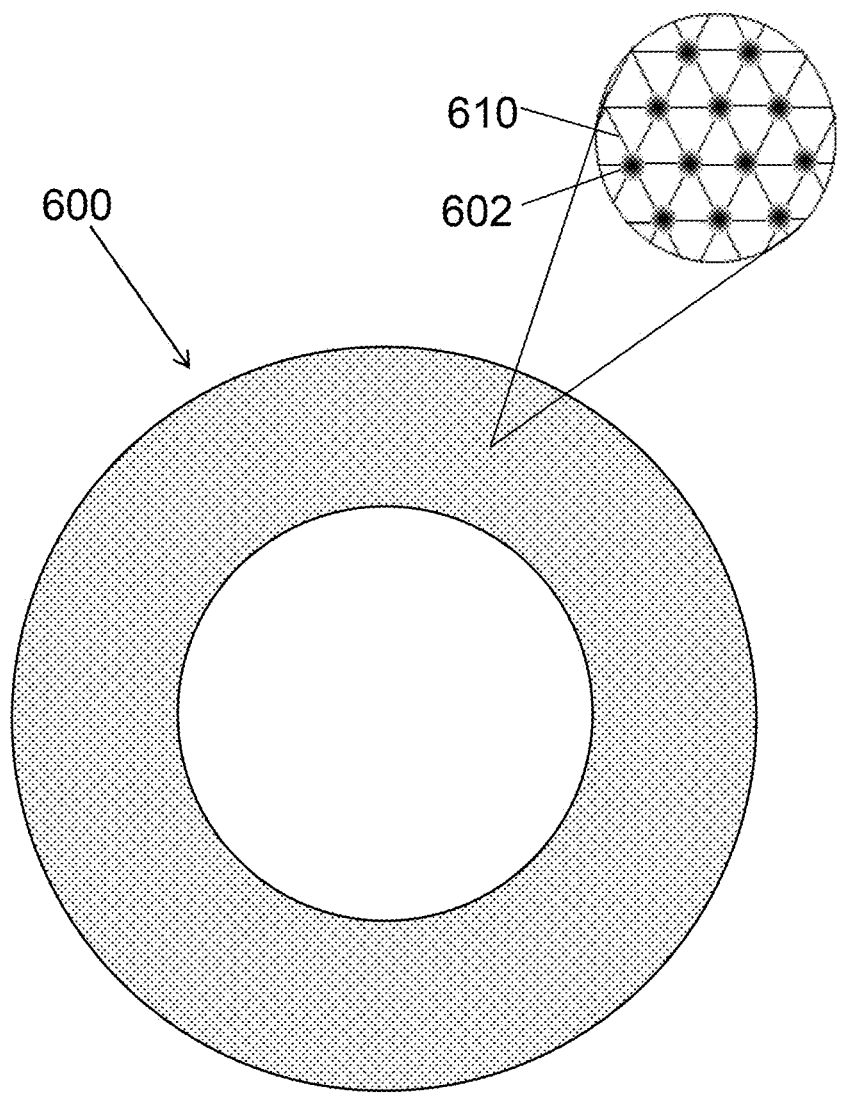
FIG. 4 is a schematic top view of a film having an annular region surrounding a central region, wherein the annular region includes a plurality of GRIN elements arranged on lattice points of a triangular lattice, according to an embodiment of the present disclosure.

FIG. 4 shows a schematic top view of a film 600 for applying to an ophthalmic lens. The film 600 has an annular planform shape, and includes a plurality of GRIN elements 602 arranged on lattice points of a triangular lattice 610, according to an embodiment of the present disclosure. The GRIN optical elements 602 each have a gradient of refractive index that varies continuously and transversely across the element, and each element has the same variation in refractive index.

Figure 5:
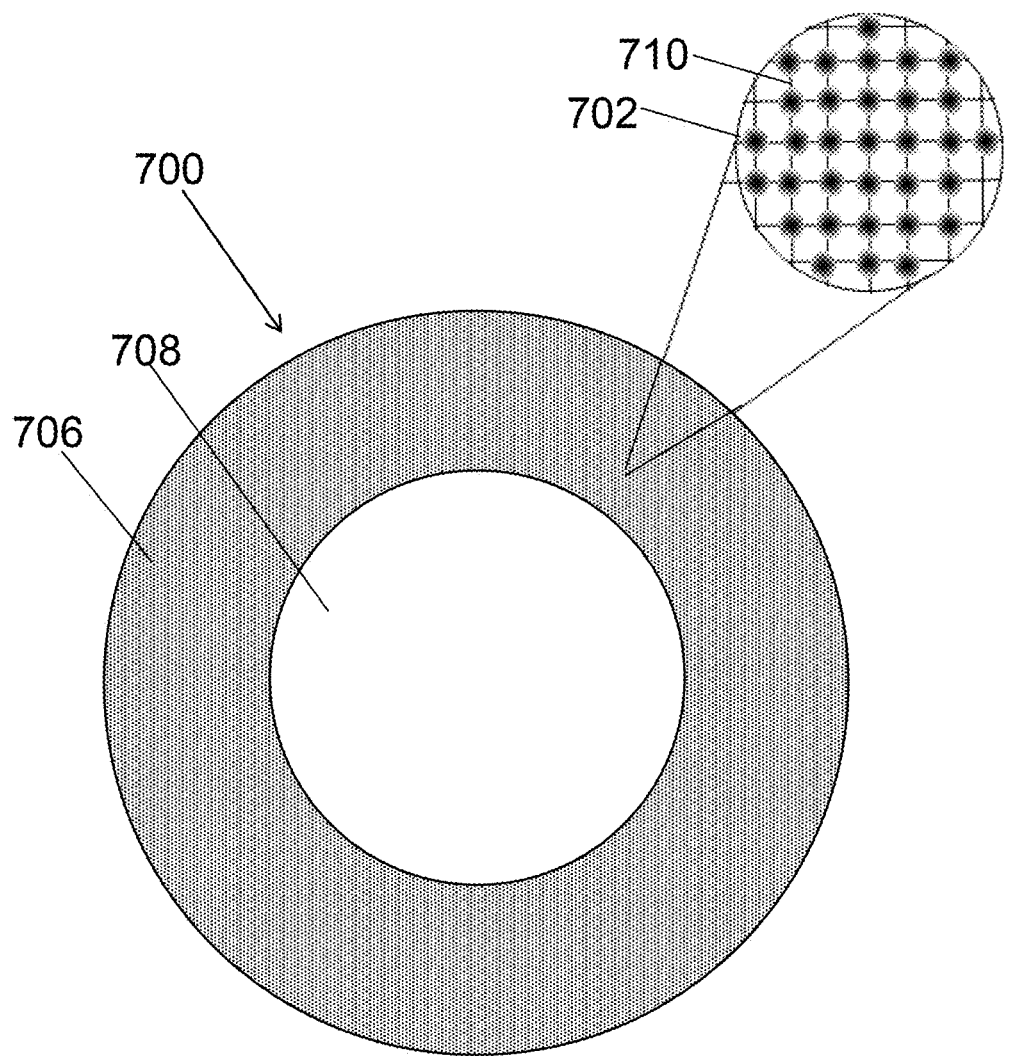
FIG. 5 is a schematic top view of a film having an annular region surrounding a central region, wherein the annular region includes a plurality of GRIN elements arranged on lattice points of a square lattice, according to an embodiment of the present disclosure.

FIG. 5 shows a schematic top view of a film 700 for applying to an ophthalmic lens to prevent or slow the development or progression of myopia, the film having an annular region 706 surrounding a central region 708, wherein the annular region includes a plurality of GRIN elements 702 arranged on lattice points of a square lattice 710, according to an embodiment of the present disclosure. The GRIN optical elements 702 each have a gradient of refractive index that varies continuously and transversely across the element, and each element has the same variation in refractive index. The central region 708 of the film does not contain any GRIN optical elements 702.

Figure 6:
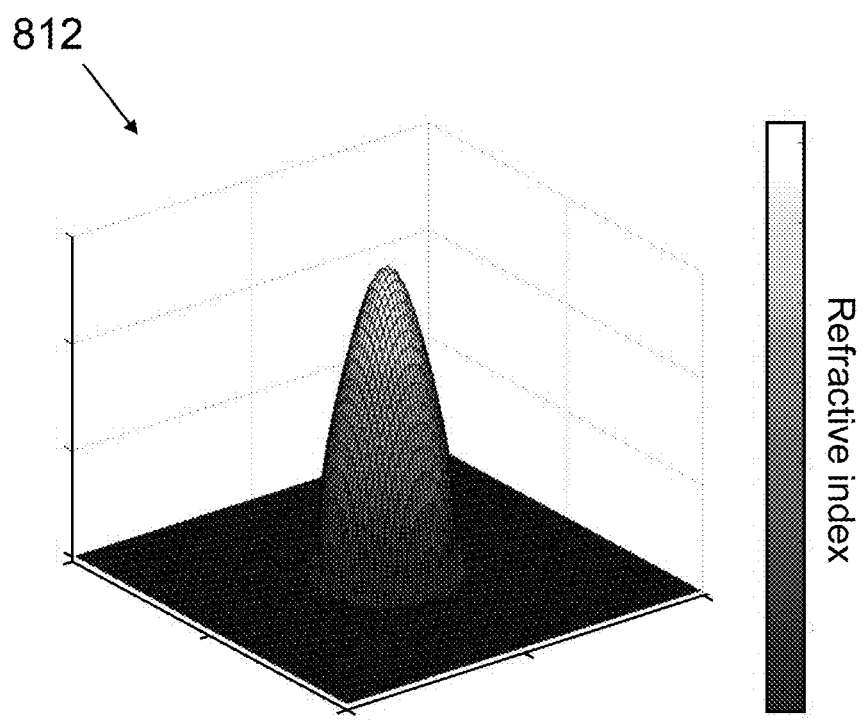
FIG. 6 is a graph showing the refractive index variation of a GRIN element that may be included in a film according to an embodiment of the present disclosure.

FIG. 6 is a graph 812 showing the refractive index variation of a GRIN element that may be included in a film according to an embodiment of the present disclosure. The GRIN element has a varying refractive index profile defined by a quadratic function in 3 dimensions, such that the greatest refractive index is at the centre of the element, and the refractive index decreases radially outwards from the centre of the element. The variation in refractive index causes increased scattering of light that is incident upon the GRIN optical element in comparison to an area of film that does not contain a GRIN optical element.

Figure 7:
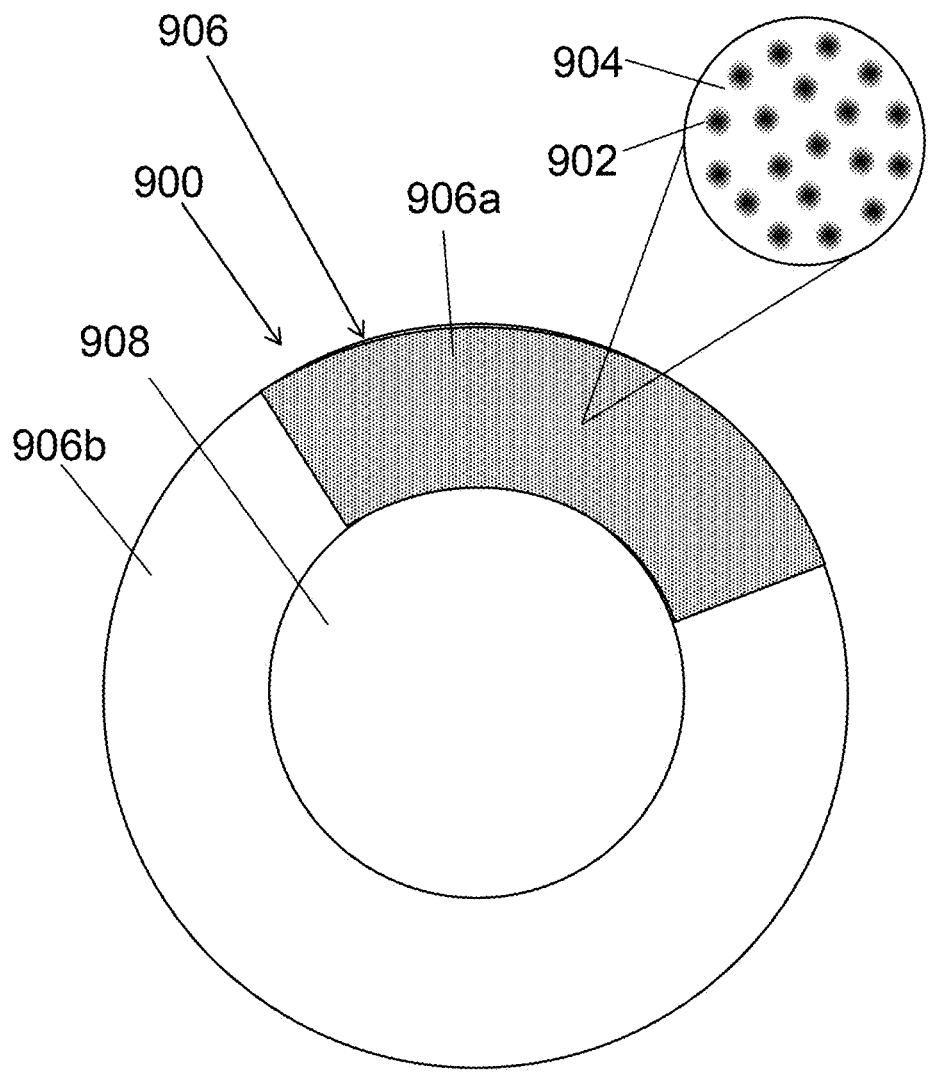
FIG. 7 is a schematic top view of a film having an annular region surrounding a central region, wherein a portion of the annular region includes a plurality of GRIN elements, according to an embodiment of the present disclosure.

FIG. 7 shows a schematic top view of a film 900 for applying to an ophthalmic lens, the film 900 having an annular region 906 (shown as region 906a and region 906b) surrounding a central region 908, wherein a portion of the annular region 906a includes a plurality of GRIN elements 902 arranged on the surface of a film 904, according to an embodiment of the present disclosure. The GRIN optical elements 902 each have a gradient of refractive index that varies continuously and transversely across the element and each element has the same variation in refractive index. The GRIN optical elements 902 are distributed at regular intervals across a portion 906a of a surface of the film 904. Each of the GRIN optical elements 902 is a photocured optical element. When light falls incident on the GRIN optical elements 902 it is scattered more in comparison to light falling incident on the area of the film that does not contain optical elements 908. The portion 906a of the film that includes GRIN elements spans approximately ¼ of the circumference of the annular region. If the film 900 is applied to a lens that is worn by a user, light that is targeted towards specific regions of the retina may be scattered by the GRIN elements 902.

Figure 8:
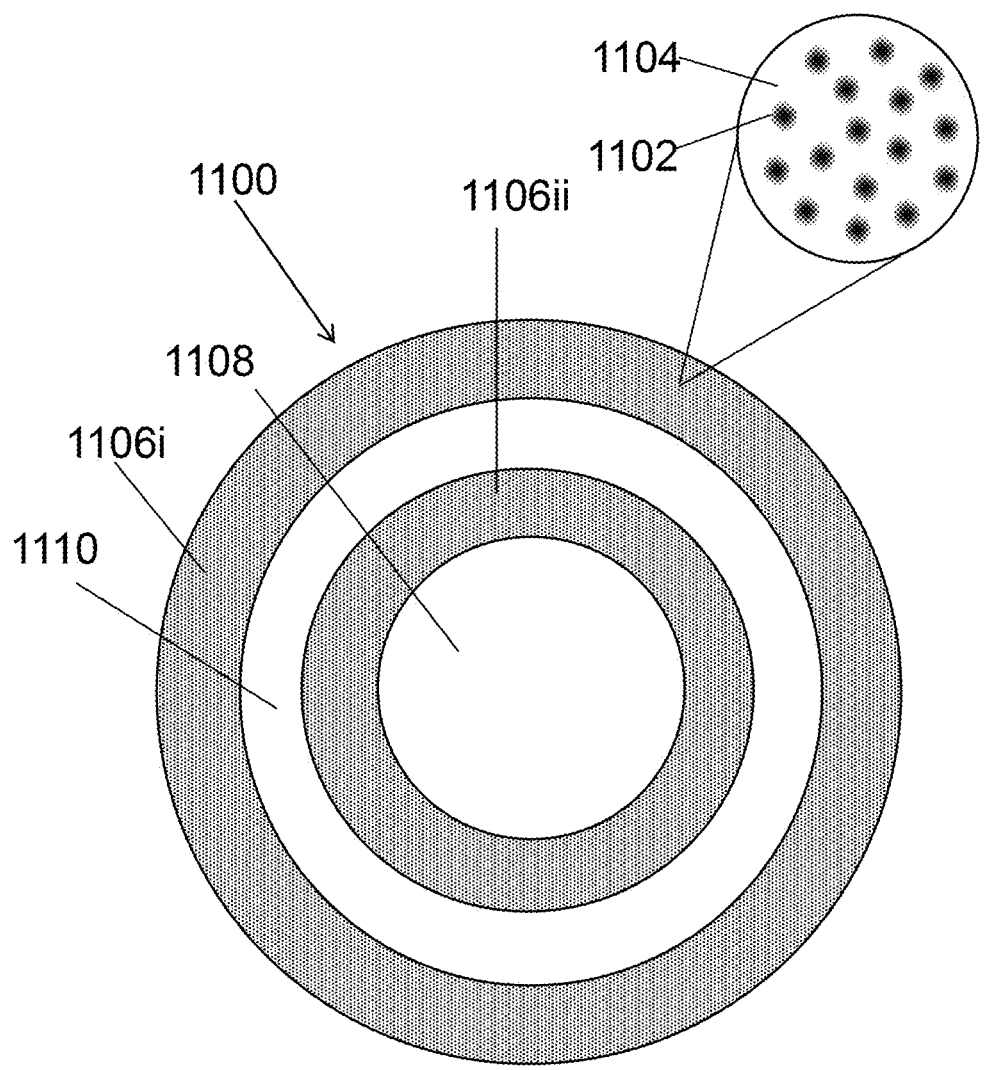
FIG. 8 is a schematic top view of a film having two concentric annular regions surrounding a central region, wherein each annular region includes a plurality of GRIN elements, according to an embodiment of the present disclosure.

FIG. 8 shows a schematic top view of a film 1100 for applying to an ophthalmic lens, the film having two concentric annular regions 1106i and 1106ii surrounding a central region 1108, wherein each annular region includes a plurality of GRIN elements 1102, according to an embodiment of the present disclosure. An annular region 1110 with no GRIN elements separates annular regions 1106i and 1106ii. The GRIN optical elements 1102 each have a gradient of refractive index that varies continuously and transversely across the element and each element has the same variation in refractive index. The base refractive index of the film 1104 is constant and the film has a uniform thickness. The GRIN optical elements 1102 are distributed at regular intervals across the concentric annular regions 1106i and 1106ii of the film. Each of the GRIN optical elements 1102 is a photocured optical element. When light falls incident on the GRIN optical elements 1102 it is scattered more in comparison to light falling incident on the area of the film that does not contain optical elements 1108. In between the concentric regions 1106i and 1106ii that include GRIN optical elements 1102, there is a region of the film 1100 that has the base refractive index and that does not include any GRIN optical elements 1102. If the film 1100 is applied to a lens that is worn by a user, light that is targeted towards specific concentric regions of the retina will be scattered by the GRIN optical elements 1102.

Figure 9:
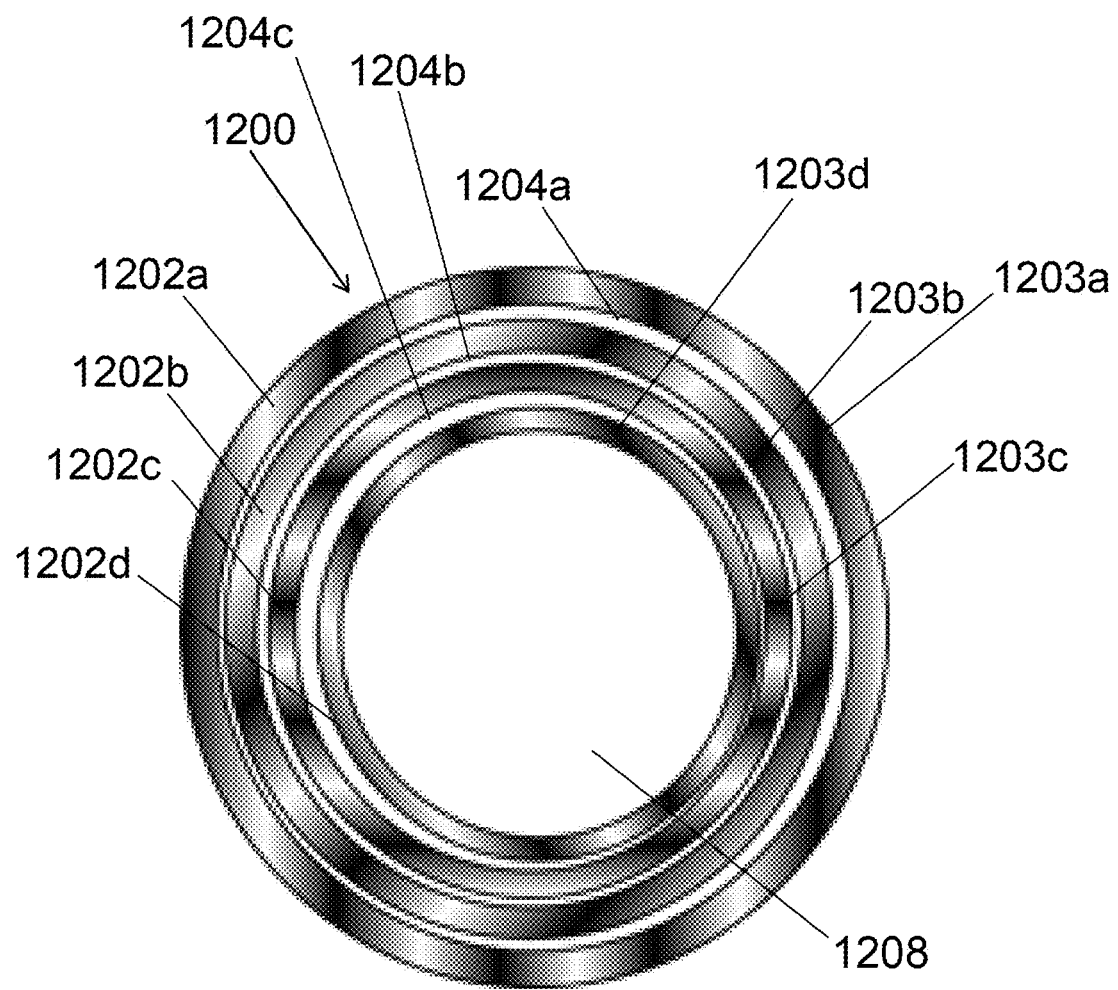
FIG. 9 is a schematic top view of a film having a plurality of concentric annular regions, wherein each annular region includes periodically arranged GRIN elements, according to an embodiment of the present disclosure.

FIG. 9 shows a schematic top view of a film 1200 for applying to an ophthalmic lens, the film including a plurality of concentric annular regions 1202a-d, each annular region 1202a-d including a plurality of GRIN optical elements 1203a-d, according to an embodiment of the present disclosure. The GRIN optical elements 1203a-d are distributed around each annular region 1202a-d such that the positioning of the GRIN optical elements 1203b around one of the annular regions 1202b, is out of phase with the positioning of the GRIN optical elements 1203a/1203c in the adjacent annular regions 1202a/1202c. The concentric annular regions 1202a-d are radially separated by regions of the film 1204a-c that have the base refractive index. The central region 1208 of the film does not contain any GRIN optical elements. In other embodiments of the present disclosure (not shown), concentric annular regions may be adjacent to each other, i.e., not separated by regions having the base refractive index.

Figure 10:
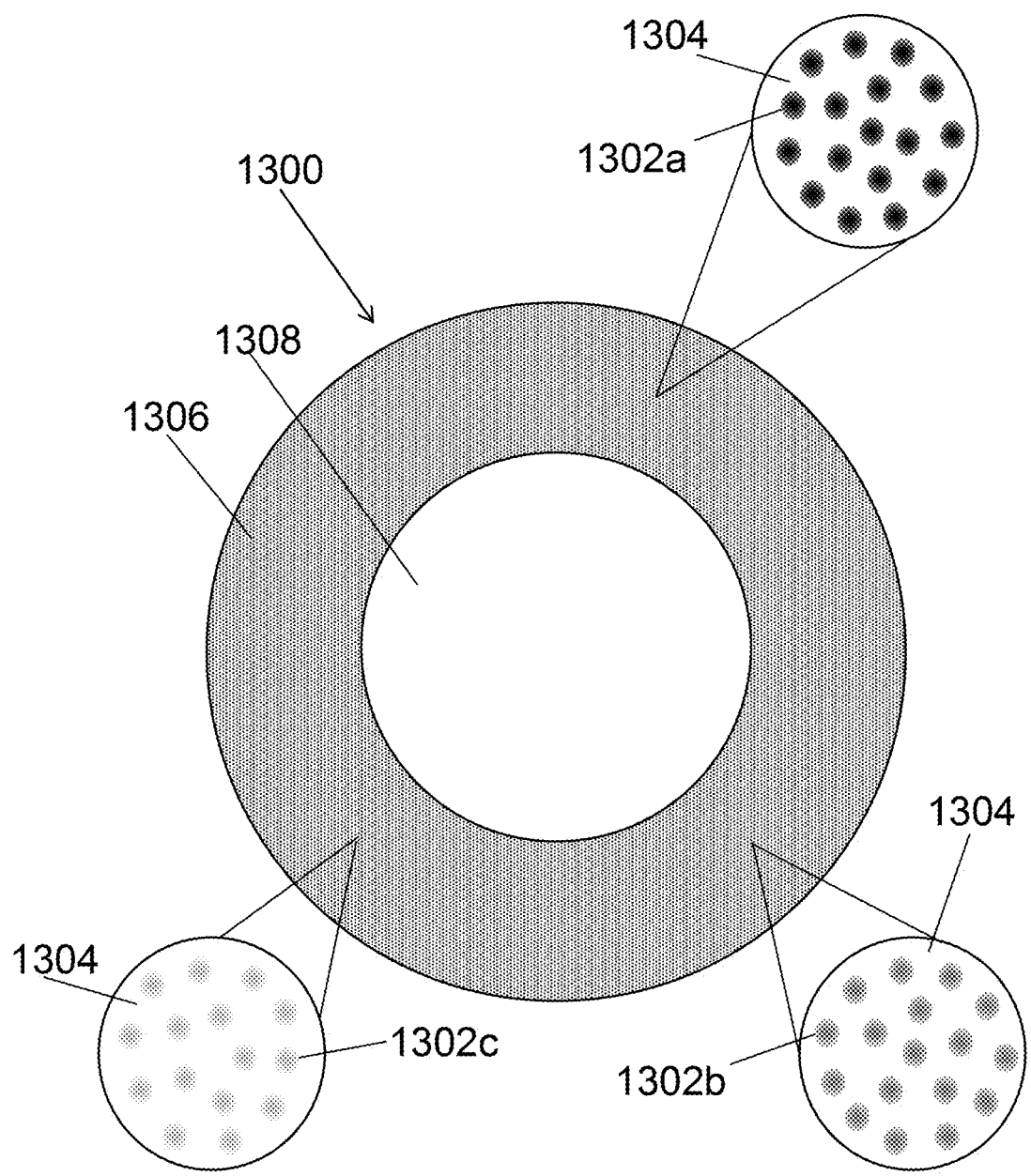
FIG. 10 is a schematic top view of a film having an annular region surrounding a central region, wherein the annular region includes a plurality of GRIN elements, and wherein different GRIN elements have different GRIN refractive index profiles, according to an embodiment of the present disclosure.

FIG. 10 shows a schematic top view of film 1300 for applying to an ophthalmic lens to prevent or slow the development or progression of myopia, the film having an annular region 1306 surrounding a central region 1308, wherein the annular region includes a plurality of GRIN optical elements 1302a, 1302b, 1302c, according to an embodiment of the present disclosure. Each of the GRIN optical elements 1302a, 1302b, 1302c, has a gradient of refractive index that varies continuously and transversely across the element in a direction parallel to a surface of the film 1300. Different GRIN optical elements 1302a, 1302b, 1302c, have different GRIN refractive index profiles, as indicated by the shading of the elements 1302a, 1302b, 1302c in FIG. 10. The darkest elements 1302a have higher average refractive index values (where the average is taken as the average refractive index value across a single element), and the lightest elements 1302c have lower average refractive index value. Elements 1302a, 1302b, 1302c having similar average refractive index values are grouped together at different meridians around the annular region 1306. The base refractive index of the film 1304 is constant and the film has a uniform thickness. The film 1300 has a circular planform shape and is therefore suitable for applying to the surface of a contact lens. The GRIN optical elements 1302a, 1302b, 1302c are distributed at regular intervals within the annular region 1306 of film. The central region 1308 of the film does not contain any GRIN optical elements 1302a, 1302b, 1302c. Each of the GRIN optical elements is a photocured optical element. When light falls incident on the GRIN optical elements 1302a, 1302b, 1302c it is scattered more in comparison to light falling incident on the area of the film that does not contain optical elements 1308. Light will be scattered more strongly by GRIN optical elements that have a higher average refractive index value.

The present ophthalmic lenses can be made by placing any of the films described herein in contact with a surface of the ophthalmic lens. For example, the films may be placed in contact with an anterior surface of the ophthalmic lens. The ophthalmic lens so manufactured may be a spectacle lens or a contact lens. In some embodiments, the film is applied to the surface of the ophthalmic lens by the lens manufacturer. In other embodiments, the film is applied to the surface of the ophthalmic lens by an eye care practitioner. In yet further embodiments, the film may be applied by the ophthalmic lens wearer after purchasing the ophthalmic lenses. As described herein, the application may be accomplished by adhering the film to the ophthalmic lens surface using an adhesive.

Whilst the present disclosure has been described and illustrated with reference to particular embodiments, it will be appreciated by those of ordinary skill in the art that the disclosure lends itself to many different variations not specifically illustrated herein. By way of example only, certain possible variations will now be described.

In example embodiments of the present disclosure, each GRIN element may have an average refractive index that is higher than the base refractive index. In other example embodiments, each GRIN element may have an average refractive index that is lower than the base refractive index.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A film for applying to an ophthalmic lens, wherein the film has a base refractive index and includes a plurality of gradient index optical elements that are distributed across an area of the film, wherein each gradient index optical element is a lens, each gradient index optical element has a volume of between 100 μm$^3$ and 3 mm$^3$, and each gradient index optical element has a radial variation in refractive index or a transverse variation in refractive index across the element.

2. The film according to claim 1, wherein the plurality of gradient index optical elements are distributed on lattice points of a triangular lattice.

3. The film according to claim 1, wherein each of the at least one gradient index optical element is a photocured optical element.

4. The film according to claim 1, wherein each of the at least one gradient index optical element has a varying refractive index defined by a quadratic profile.

5. The film according to claim 1, wherein the plurality of the gradient index optical elements occupy between 20% and 80% of a surface area of the film.

6. The film according to claim 1, comprising a central region, and an annular region surrounding the central region, wherein the annular region includes the at least one gradient index optical element.

7. The film according to claim 6, wherein a plurality of the at least one gradient index optical element is arranged periodically around the annular region.

8. The film according to claim 6, including a plurality of concentric annular regions, each annular region including at least one gradient index annular optical element.

9. The film according to claim 8, wherein at least one gradient index optical element in a first annular region is out of phase with at least one gradient index optical element in an adjacent second annular region.

10. The film according to claim 8, wherein the concentric annular regions are radially separated by a region of the layer having the base refractive power.

11. The film according to claim 8, wherein the concentric annular regions are adjacent to each other.

12. The film according to claim 1, wherein each of the at least one gradient index optical element has a diameter or width of between 10 μm and 2 mm.

13. The film according to claim 1, having a thickness of between 1 μm and 70 μm.

14. The film according to claim 1, further comprising an adhesive surface for adhering the film to the surface of an ophthalmic lens.

15. The film according to claim 1, further comprising a substrate configured to provide a protective layer when the film is applied to a surface of an ophthalmic lens.

16. An ophthalmic lens comprising the film of claim 1.

17. The ophthalmic lens of claim 16, which is a spectacle lens.

18. The ophthalmic lens of claim 16, which is a contact lens.

19. Spectacles, comprising the ophthalmic lens of claim 17.

* * * * *